US011334052B2

(12) United States Patent
Schoeffler et al.

(10) Patent No.: US 11,334,052 B2
(45) Date of Patent: May 17, 2022

(54) WORKER GUIDANCE SYSTEM, PROCESS SYSTEM, METHOD, COMPUTER PROGRAM, MACHINE-READABLE MEMORY MEDIUM AND ELECTRONIC CONTROL UNIT

(71) Applicant: Robert Bosch GmbH, Stuttgart (DE)

(72) Inventors: Michael Schoeffler, Calw-Altburg (DE); Sven Dose, Dresden (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/976,447

(22) PCT Filed: Feb. 4, 2019

(86) PCT No.: PCT/EP2019/052598
§ 371 (c)(1),
(2) Date: Aug. 27, 2020

(87) PCT Pub. No.: WO2019/201487
PCT Pub. Date: Oct. 24, 2019

(65) Prior Publication Data
US 2021/0026336 A1 Jan. 28, 2021

(30) Foreign Application Priority Data

Apr. 20, 2018 (DE) .......................... 102018206034.7

(51) Int. Cl.
*G05B 19/418* (2006.01)
(52) U.S. Cl.
CPC .................. *G05B 19/41805* (2013.01); *G05B 2219/31027* (2013.01); *G05B 2219/31046* (2013.01)

(58) Field of Classification Search
CPC .... G05B 19/41805; G05B 2219/31027; G05B 2219/31046; Y02P 90/02
See application file for complete search history.

(56) References Cited

U.S. PATENT DOCUMENTS

2011/0178627 A1* 7/2011 Wechter ........... G05B 19/41875
700/109

FOREIGN PATENT DOCUMENTS

| DE | 102005005266 A1 | 8/2006 |
| DE | 102015215666 A1 | 2/2017 |
| EP | 2052807 A1 | 4/2009 |

OTHER PUBLICATIONS https://www.dictionary.com/browse/using retrieved on Oct. 29, 2021 (Year: 2021).*
International Search Report for PCT/EP2019/052598, dated May 23, 2019.

* cited by examiner

*Primary Examiner* — Christopher E. Everett
(74) *Attorney, Agent, or Firm* — Norton Rose Fulbright US LLP; Gerard Messina

(57) ABSTRACT

A worker guidance system for guiding a worker when carrying out a process using a process system. The process system includes at least one process device having process device capabilities, the process including at least one work step, including a control unit and a communication device. The control unit is designed to activate the communication device based on process data to communicate to the worker the work step to be carried out. The control unit is provided with the process device capabilities as process device capability data, the process data including the process device capability data.

14 Claims, 3 Drawing Sheets

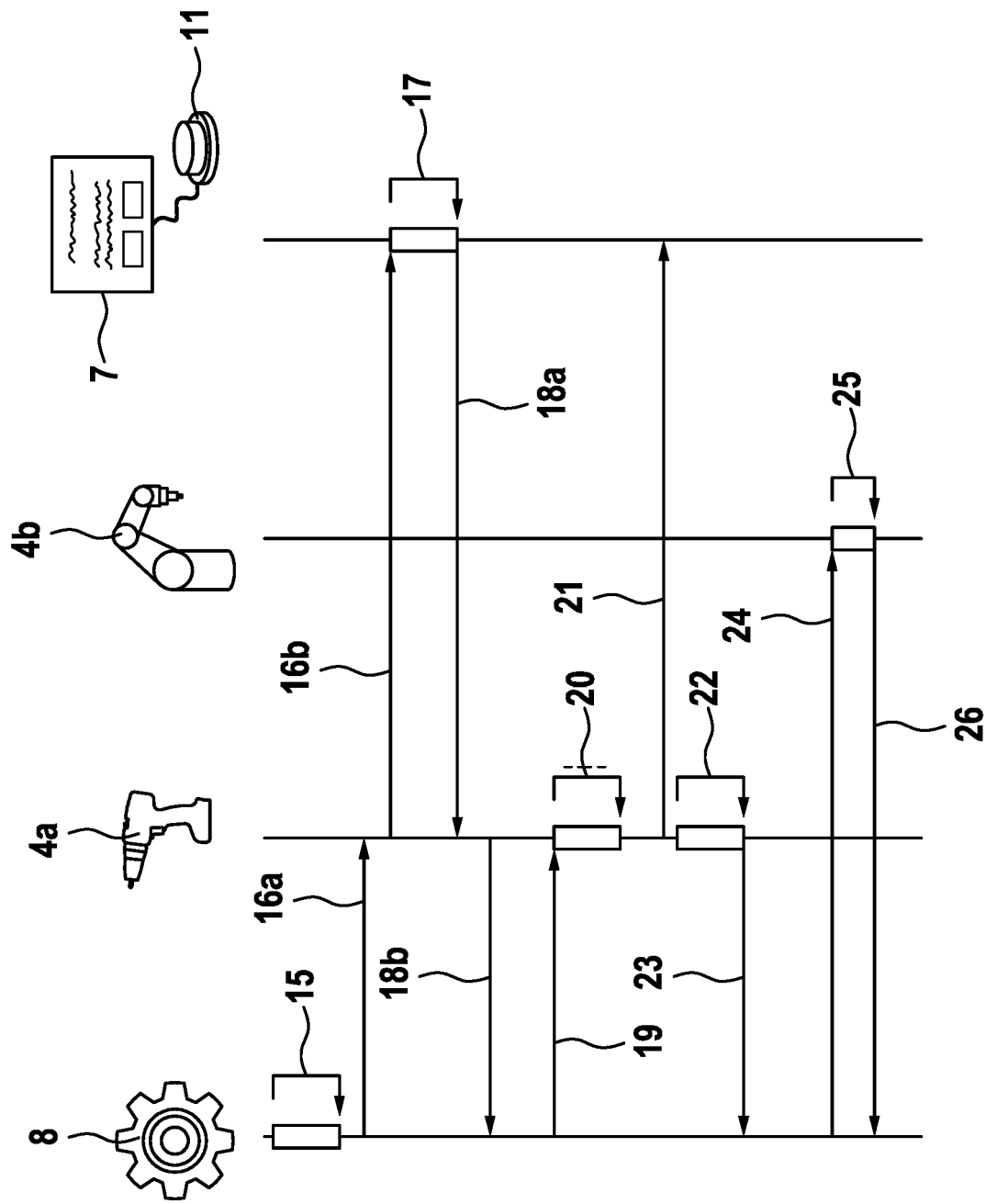

WORKER GUIDANCE SYSTEM, PROCESS SYSTEM, METHOD, COMPUTER PROGRAM, MACHINE-READABLE MEMORY MEDIUM AND ELECTRONIC CONTROL UNIT

A worker guidance system is provided for guiding a worker when carrying out a process using a process system. The process system includes at least one process device that has process device capabilities, the process including at least one work step. The worker guidance system includes a control unit and a communication device, the control unit being designed to activate the communication device based on process data to communicate to the worker the work step to be carried out.

BACKGROUND INFORMATION

In production, it is still commonplace to provide at least in part production steps to be manually carried out by a worker. This is widely common, in particular, in the manufacturing of small quantities. In order to ensure the quality and to reduce the training efforts for the worker, worker guidance systems are employed. Modern production systems, in which a worker guidance is used are, however, generally very rigid and directed to a specific selection of products. The worker guidance is permanently programmed and configured to the specific work sequences. With increasing variant diversity and simultaneous reduction in the product lifetime, this rigid programming is disadvantageous. This can be problematic, in particular, in the case of versatile production systems.

German Patent Application No. DE 10 2015 215 666 A1 describes a tool, in particular, a power tool, which includes a display device as well as means for receiving and for evaluating transmitted data. The tool is suited and capable of displaying, based on the data transmitted to the tool and on the display device, at least one piece of information, which relates to or represents at least one work step to be performed, in particular, with the tool.

SUMMARY

In accordance with the present invention, a worker guidance system is provided for guiding a worker. Also provided is a process system, a method, a computer program, and a machine-readable memory medium.

The research work that led to these results was funded by the European Union under the funding code 680759.

In accordance with the present invention, a worker guidance system for guiding a worker is provided. In accordance with an example embodiment, the worker guidance system is, in particular, a programmable, for example, a reprogrammable worker guidance system and, in particular, a graphically programmable worker guidance system. The worker guidance system is designed to guide a worker when carrying out a process and/or multiple processes with the aid of a process system. The worker is, for example, a person who carries out the process. The process may be a production process, a machining process or a measuring process. The worker guidance system is configured to give the worker instructions as to which work steps are to be carried out in which manner, the correct implementation of the manually carried out work steps, preferably sensor-assisted, being monitored. The process system is and/or includes, for example, a workstation, a measuring station or a production facility. The process system may be semi-automated. The process system is designed, in particular, to provide manual work steps of the worker.

The process system is designed to manufacture, to check or to machine a workpiece. The process system is designed, in particular, for a variable workpiece spectrum. The process system may preferably be reconfigured and thus adapted to different workpieces.

The process system includes at least one process device having process device capabilities. The process system includes, for example, exactly one process device, in particular, more than three process devices and, in particular, more than ten process devices. The process devices are designed preferably for interaction with the worker. The process devices are tools for the worker, for example. The process device capabilities are, for example, self-descriptions of the process device, for example, which capabilities, options and/or machining steps the process device enables. The process device capabilities are preferably stored data-technologically in the worker guidance system, for example, of a central database. Alternatively, the process device capabilities may be stored data-technologically in the process device. The process device capabilities are preferably stored once and/or initially, for example, by the manufacturer.

The process includes at least one work step. The process preferably includes multiple work steps, in particular, at least one work step being a manual work step, to be carried out by the worker. The work step is preferably to be carried out using the process device. For example, the work step is a machining or a measuring of the workpiece. The work step is, in particular, a drilling, grinding or a machining using a tool, for example. In particular, the work step is a machining of the workpiece with the aid of the process device. The process is preferably a production or a check of the workpiece.

The example worker guidance system includes a control unit and a communication device. The control unit is a processing unit, a processor or a computer chip, for example. The control unit may be a central control unit. It may, in particular, also be provided that the process device includes the control unit. The process system includes, in particular, the control unit. The communication device may be a central communication device, alternatively and/or in addition, the communication device is encompassed by the process device. The communication device may also be part of the process system. For example, the communication device is a display device, in particular, a screen or lights that are able to display positions. The communication device may also be an acoustic communication device, for example, a loudspeaker for outputting announcements or an otherwise acoustic signal.

The control unit is designed to activate the communication device based on the process data. The control unit and the communication device are, in particular, connected in a data-technical manner to one another. Based on the process data, the control unit activates the communication device to communicate work steps to the worker to be carried out according to the process. For example, the control unit activates the communication device to display to the worker which work step is to be carried out by the worker how, when and/or where. For this purpose, the communication device displays, for example, an image, a video or pieces of text information on the screen regarding the work step to be carried out. The process device capabilities, in particular, may be displayed. Furthermore, it may also be provided, for example, that the communication device displays to the worker with the aid of the flashing of lights where he/she must carry out a work step, for example, with which tool and/or with which process device. Displayable pieces of information for the work step to be carried out are, for example, how a work step is to be executed, which components are to be used. It is further also possible to display to the worker a reconfiguration of the process system, of the process device and/or of other tools as pieces of information to be displayed and/or to be communicated. This includes, for example, pieces of information as to how a process device may be dismantled and is to be removed from the work area and/or from the process system. It is further possible to communicate to the worker which process device is to be assembled how in the work area and how this process device is to be put into operation. The pieces of information to be communicated are controlled, in particular, both by a sequence control as well as by the processes themselves.

The control unit is provided with the process device capabilities as process device capability data. For this purpose, the control unit is data-technologically connected and/or is connectable to the process device. The process data include the process device capability data. Thus, the activation of the communication device to display and/or to communicate the work step to be carried out takes place, in particular, also based on the process device capabilities. For example, the process device capabilities include pieces of information, videos and/or images as to how these are to be used, these pieces of information being communicable to the worker directly and/or processed with the aid of the communication device. The process data also include, for example, how a workpiece is machinable and/or is to be machined using the process device, these pieces of information for using the process device being communicable with the aid of the communication device by providing the process device capability data to the control unit. This results therefore in a dynamic adaptation of the worker guidance, since pieces of information and/or data are variably adaptable based on the process device and/or on the associated process device capabilities.

The worker guidance system thus makes it possible to flexibly support a versatile production system, physically reconfigurable process systems also being capable of being easily adaptable and/or orchestrated with the aid of the worker guidance system. Since the worker guidance system is dynamically designed, changes in the work sequence in the worker guidance are not difficult to program, since these adaptations are easily combinable with the aid of the process device capabilities. The engineering effort in the adaptation of the worker guidance system is therefore reduced. The required sequences for manufacturing, for example, during the product assembly, are modelled, in particular, as a linked structure or as a sequence of process device capabilities and the individual parts and/or process means involved. The control unit may interpret work plans and carry out autonomously the adaptation of the communication device and/or communication of the processes and/or work steps, the correct and/or necessary pieces of information being communicated to the worker.

It is particularly preferred that the process data include a process sequence. The process sequence includes, in particular, multiple work steps. For example, the process sequence is a sequence of multiple work steps, the process sequence including the order, the duration and/or the combination of work steps. The process sequence may include automatic, manual and/or semi-manual work steps. In particular, it may be provided that the control unit is designed to communicate the process sequence to the worker, for example, with the aid of the communication device. The process sequence may, for example, be communicated to the worker as a workflow.

It is optionally provided that the process device capability data include pieces of information relating to the work step to be communicated. The process device is a screw-driving station, for example, the process device capability data including as information to communicate to the worker that he/she is to screw a screw with a torque into an object. The control unit may access this information and communicate it to the worker on the communication device. Pieces of information relating to the work step to be communicated may, in particular, also be stored in the process data and/or in the process sequence.

One example embodiment of the present invention provides that the control unit is designed to select a process device suitable for the work step and/or process based on the process, on the work step, on the process sequence and/or on the process data. For example, the process is "screwing together with torque X", "force-fitting component Y" and "detect measured variable Z". The control unit is designed to extract the work steps based on the process and/or the process sequence. In the above example, the work steps are "screwing together", "force-fitting" and "measure Z". The control unit is designed, in particular, to assign a process device to the work steps based on the process device capability data. In the above example, to assign to the work step "screwing together" a screw-driving station as a process device, to assign to the work step "force-fitting" a press and to assign to the work step "measure Z" a measuring device.

In accordance with the present invention, it is particularly preferred that the control unit is designed to start and/or to activate the process device to carry out the work step. The process device may, in particular, have implemented the work step and/or pieces of work step information. If, for example, the work step is fully automatic, the process device may be activated to carry out the process without worker instructions. If the work step is manual or semi-manual, the implementation may include an instruction of the worker. For example, the implementation of the instruction may include the activation of small lights located in the process device to guide the worker. An internal or external display may further be activated, for example, to guide the worker, the process device itself, in particular, searching for and/or activating a display, a communication device or a process device capable of communicating. If specific pieces of information, for example, photos or value parameters are necessary, the control unit and/or the process device may, for example, be designed to specify and/or to determine the required parameters and or data. Specific pieces of information may, for example, be extracted, in particular, from data sources, for example, from a modeling of the process, of the work sequence and/or from an external data source. Data and/or work steps to be communicated may, in particular, be stored in text format and/or image format in the process device.

One example embodiment of the present invention provides that the process provides the installation and/or the use of a component. The process may, in particular, include a work step for installing and/or for using the component. The process data include, in particular, pieces of component information. The pieces of component information may include, in particular, a component number, a component geometry or a component photo. The control unit is designed, for example, to activate the communication device based on the process data to display an image and/or a component number of the component to the worker, so that the worker knows which component he/she must use. The process data may further include pieces of information with which process parameters the component and/or the work step is to be carried out, for example, which torque is necessary, which machining temperature and/or which measuring parameters are provided. It may be provided, in particular, that the worker guidance system is able to sensorially detect whether the worker used the correct component, this calibration preferably with sensor-detected data being able to be based on a comparison of the process data and/or the pieces of component information.

It is particularly preferred that the pieces of component information are provided by an ERP system. An ERP system stands for Enterprise-Resourcing-Planning System. The ERP system may be stored centrally in the worker guidance system or in the process system. It may be further provided that the worker guidance system is connected to an external ERP system, the pieces of component information being provided to the worker guidance system by the ERP system. The ERP system may, for example, provide as pieces of component information to the worker guidance system the number and/or the location of the component. One example embodiment of the present invention provides that the worker guidance system includes a sensor unit for monitoring the work step, the process and/or the production facility. The sensor unit is designed to provide sensor data. For example, the sensor unit is a visual sensor unit, for example, a camera unit; alternatively, the sensor unit may be a chip reading unit, a haptic sensor unit or a sensor unit for measuring electromagnetic properties. In this case, the process data include, in particular, the sensor data. The sensor unit is designed, for example, to detect whether the worker has processed a workpiece and/or whether a work step has been carried out by the worker. The carried-out work step and/or the use of the component may be used as sensor data by the control unit. The control unit is then designed, for example, to continue the process sequence and, for example, to communicate the next work step to the worker. It may, in particular, also be provided that the sensor unit is an actuating switch, the actuating switch to be actuated, for example, by the worker when he/she has carried out the work step. Thus, the worker guidance system and/or the control unit may communicate the next instruction and/or next communication to the worker if it has been sensorially recognized that a work step has been successfully carried out. If a sensorial detection is not possible, the worker may be prompted to acknowledge the work step.

It is particularly preferred that the process includes at least two work steps. The two work steps are executable and/or to be carried out in the process preferably in a particular order. The control unit in this case is preferably designed to activate the communication device based on the process data to indicate to the worker in a correct order the work steps of the process for execution. For example, the work steps and/or the following work step are only displayed to the worker if the previous work step has been carried out. For this purpose, the process data include, in particular, the process sequence.

One example embodiment of the present invention provides that the work steps are representable and/or designed as a sequence and/or a linkage of process device capabilities. The process may, for example, be represented as a sequence of work steps. The process is stored in the control unit, in particular, as such a linkage and/or sequence of work steps. It is particularly preferred that the control unit is designed to assign a process device to at least one work step. It may be provided, in particular, that the worker guidance system is programmable by the worker and/or a person, in particular, graphically programmable to create a new process by a linkage of work steps based on process device capabilities. After the process system is modified by the addition of an additional process unit having stored process device capabilities, a process may then be created that includes a new work step, which is integrable into the sequence and/or into the linkage. A modularly created worker guidance system is thereby provided.

It is particularly preferred that the control unit is designed to extract and to display with the aid of the communication device pieces of information to be communicated based on the process, on the work step, on the process sequence, on the process device capabilities and/or on the process data. It is provided, for example, that if a process is required for the manufacture of a product, which is presently not available, a process device is determined, which is intended to guide its dismantling. Subsequent to this dismantling, it may be provided that the control unit is designed to communicate to the worker which process device he/she should construct.

It is particularly preferred that the worker guidance system includes an input device. The input device is, for example, a keypad, a touch screen or a voice control device. With the aid of the input device, it is provided, in particular, that the worker is able to configure and/or establish process parameters. The process parameters are based preferably on the process device capabilities. For example, the worker and/or a person may configure how a process device is to be used, in particular, with which parameters. The process device is a screw-driving device, for example, it being configurable with the aid of the input device which torque is to be used in the process and/or in the work step.

It may be provided, in particular, that the worker guidance system includes a feedback device, the feedback device being designed to provide an actuation by the worker as worker data. The worker data are to be understood, in particular, as being similar to the sensor data. The process data preferably include the worker data. With the aid of the worker data and/or the actuation of the feedback device, a worker is able, for example, to communicate to the worker guidance system and/or to the control unit that he/she has carried out a work step and/or a process. The actuation of the feedback device may, for example, mean an acknowledgement and/or the completion of a work step.

The worker guidance system may also be designed as a capability-based system, in which the communication of the work step is modeled once, but the data, in particular, process data, are dynamically integrated. In this case, it is provided, for example, that the work steps are modeled as a secondary sequence before the start of the process. In this case, it is provided, in particular, that the process device provides its function as process device capability data, for example, "set screw program with M torque" and/or "confirm completion". The communication device preferably provides "display worker command" as a function. The process and/or the work sequence is/are modelled by the control unit in such a way that it resorts to the provided functions of the process devices. For example, a process sequence "guided screwing" is modelled from the provided functions: "start", "show worker command ("please screw in the component 'Bx' at the position indicated", component x, image)", "set screw program(Ma)→confirm completion( )", "end". The parameters of the modeled sequence in this case are "component Bx", image and Ma.

A further aspect of the present invention is a process system. In accordance with an example embodiment of the present invention, the process system includes, in particular, a process device. The process device in turn has, in particular, process device capabilities. The process system includes a worker guidance system. The worker guidance system is designed, in particular, as described above. The worker guidance system is designed, in particular, to communicate to the worker a work step to be carried out when using the process system. The activation and/or the communication of the work step to be carried out is/are based, in particular, on process data. The process data in turn include the process device capabilities, in particular, as process device capability data.

A further aspect of the present invention is a method for guiding a worker when carrying out a work step with the aid of a process system. In accordance with an example embodiment of the present invention, in this method, a work step to be carried out is communicated to the worker. The communication of the work step to be carried out takes place based on process data. The process data include process device capability data. The process device capability data include process device capabilities of process devices. Process devices are, for example, modules, tools and/or objects, which the worker must use for carrying out the work step. For example, the process device is a drilling station, the process device capabilities including pieces of information that a drilling device is involved, whose rotational speeds and/or torques are adjustable. The communication of the work step may then include the display and/or communication of these process device capabilities, for example, the display of the rotational speeds and/or torques that are possible and/or are to be used.

A further aspect of the present invention is a computer program, which is designed to carry out all steps of the previously described method when the computer program is used and/or executed on a processing unit and/or on the worker guidance system.

A further aspect of the present invention is a machine-readable memory medium, the computer program as previously described being stored on the machine-readable memory medium.

A further aspect of the present invention is an electronic control unit, the electronic control unit being designed to carry out all steps of the method.

BRIEF DESCRIPTION OF THE DRAWINGS

Additional advantages, effects and embodiments result from the accompanying figures and from their description.

FIG. 3 shows sequences during the course of a process in accordance with an example embodiment of the present invention.

DETAILED DESCRIPTION OF EXAMPLE EMBODIMENTS

Figure 1:
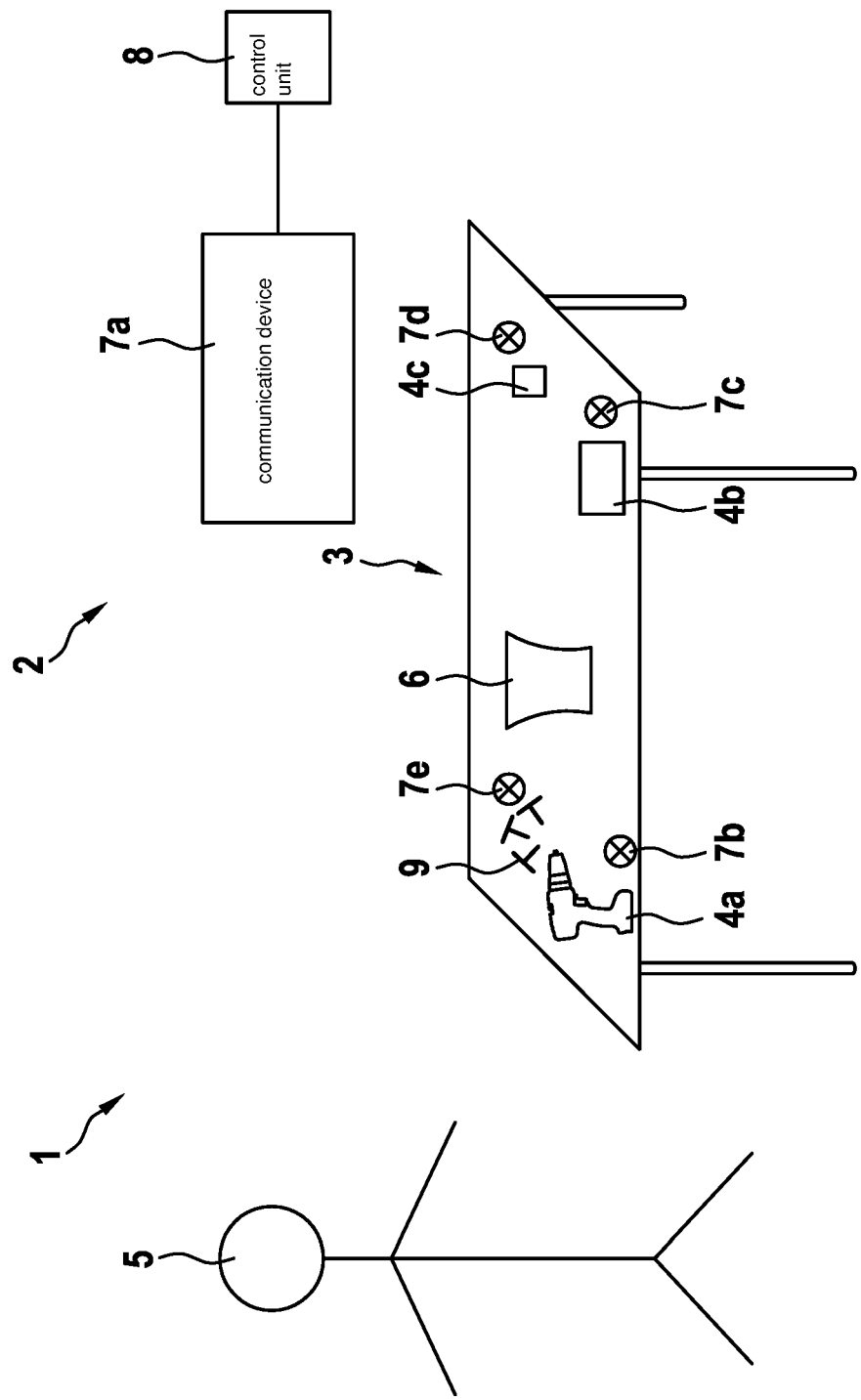
FIG. 1 shows one exemplary embodiment of a process system in accordance with the present invention.

FIG. 1 shows one exemplary embodiment of a process system 1. Process system 1 includes a worker guidance system 2. Process system 1 includes a work area 3. Work area 3 is designed here as table area. A plurality of process units 4a, 4b and 4c are situated in work area 3. Process units 4a through 4c are preferably designed for use by a worker 5. For example, process device 4a is a drilling machine, for example, a cordless screwdriver having, in particular, an adjustable torque and/or an adjustable rotational speed. Process device 4b, for example, is a measuring device, for example, a multimeter. Process device 4c is a tool for mechanically machining an object. A workpiece 6 is manufacturable, measurable and/or machinable with the aid of process devices 4a through 4c. Workpiece 6 may be manufacturable and/or machinable in a semi-automated process. The process is, in particular, the manufacturing of workpiece 6 and includes one work step, which is to be carried out by worker 5. Different workpieces, in particular, are producible, machinable or measurable with the aid of process system 1 and/or with the aid of process devices 4a through 4c. Thus, process system 1 forms a variably usable system for manufacturing a workpiece portfolio. Since for this portfolio worker 5 is to be taught, in particular in the case of a new workpiece 6, process system 1 includes worker guidance system 2.

Worker guidance system 2 includes communication devices 7 and a control unit 8. Communication device 7a is designed as a screen device and is able to display images, videos and/or text to worker 5. Communication devices 7b, 7c, 7d and 7e are situated in work area 3. Communication devices 7b through 7d are designed as LEDs and are able to provide worker 5 a piece of information by switching on and off. Control unit 8 is designed to give worker 5 pieces of information for the work step to be carried out and/or for the process with the aid of communication devices 7a through 7d.

Process devices 4a through 4c have process device capabilities. The process device capabilities are, in particular, a self-description of processing devices 7a through 7c. The process device capability includes, for example, pieces of information about which process device, for example, drilling machine or multimeter, is involved and which process parameters, for example, adjustable torque, are enabled by process device 4a through 4c. The process device capabilities are provided to control unit 8 as process device capability data. Control unit 8 is designed to display pieces of information to worker 5 regarding the work step to be carried out based on the process device capability data. For example, the work step to be carried out is "drill a hole" into workpiece 6. In the process, communication device 7b, by flashing, displays to worker 5 that process device 4a is to be used. The position in the form of an image of workpiece 6 at which drilling is to take place is displayed on communication device 7a. The torque to be used may further be displayed as information to worker 5 on communication device 7a. It is provided, in particular, that after the carried-out work step, the next work step is displayed to worker 5 with the aid of the communication device.

The process may provide one work step, in which a component 9 is to be installed on workpiece 6. Control unit 8 may include pieces of component information that include, in particular, a component number and/or a component form. Control unit 8 may be designed to communicate pieces of information to worker 5 regarding the use of component 9 with the aid of communication device 7, in particular, 7a and/or 7d. For example, a screw as a component 9 must be installed in the work step on workpiece 6. In this case, control unit 8 activates LED 7d, so that worker 5 knows that he/she must use components 9. Additional pieces of information, for example, a workpiece number, may be displayed to worker 5 on communication device 7a.

Figure 2:
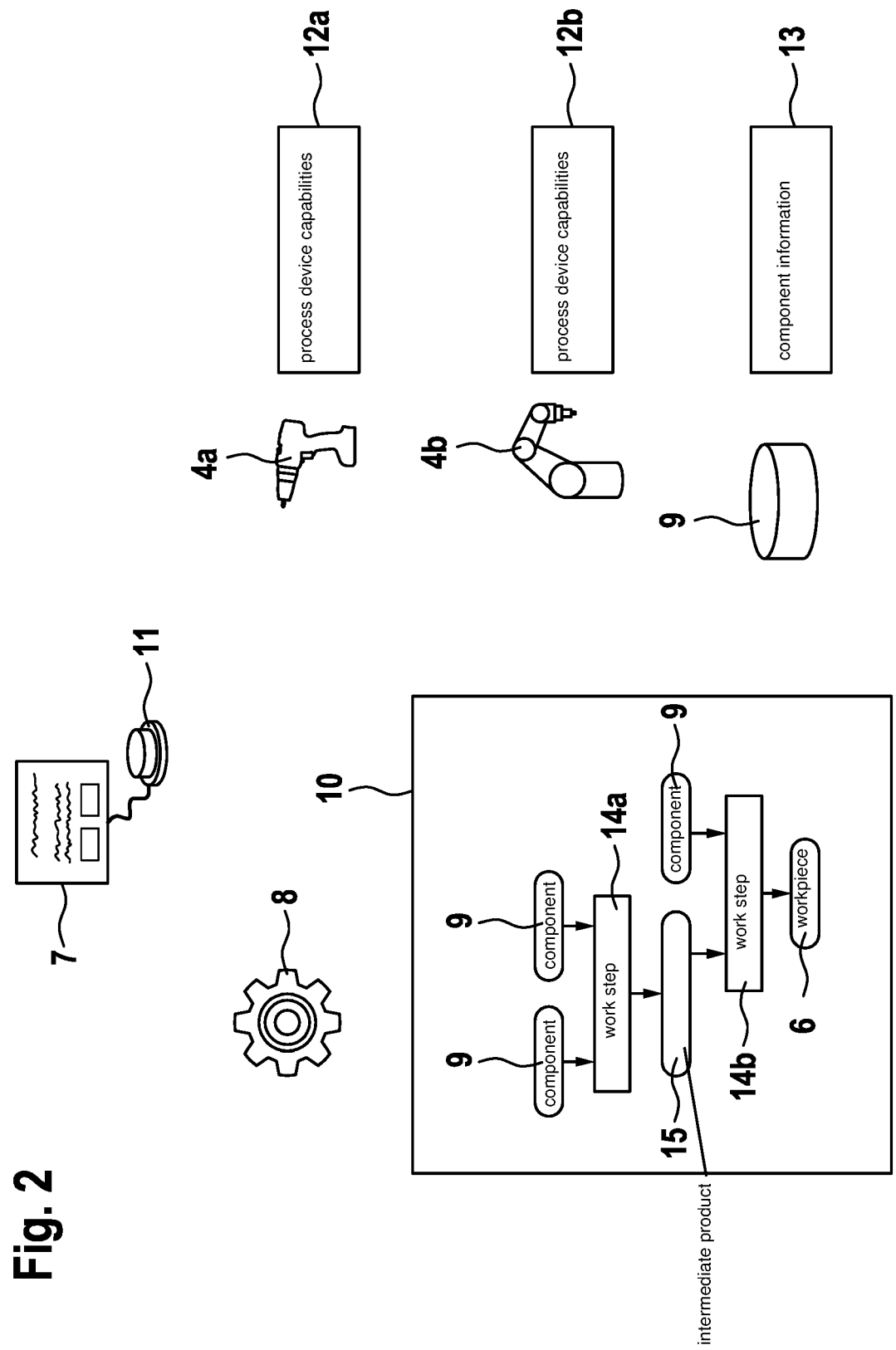
FIG. 2 shows exemplary components of the process system in accordance with an example embodiment of the present invention.

FIG. 2 schematically shows a process system 1 including its components and process sequence 10. Process system 1 includes a communication device 7. Communication device 7 is designed, for example, as a display device. Process system 1 further includes a feedback device 11, which is designed as a push button. Feedback device 11 in this exemplary embodiment is part of communication device 7. With the aid of feedback device 11, the worker is able to communicate and provide to control unit 8 the completion of a work step and/or of a process.

Process system 1 further includes a plurality of process devices 4a and 4b. Process device 4a is designed as a screwdriver. Screwdriver 4a is usable by worker 5. Process device 4a has process device capabilities 12a. Process device capabilities 12a for process device 4a are "screw in a screw", "mount a bit", and/or "remove a bit". Process device 4b is designed as an automatic process device. Process device 4d is, for example, an automatic screwdriving station. Process device 4b has process device capabilities 12b. Process device capabilities 12b are, for example, "screw in a screw", "remove a bit", and/or "mount a bit". Process device capabilities 12a and 12b are provided as process device capability data of control unit 8. Control unit 8 is designed to display pieces of information to worker 5 on communication device 7 for carrying out the work step, for example, to display "mount the screw" using process device 4a.

In process system 1, components 9 may also be provided, which may, for example, be installed and/or used with process devices 4a, 4b. Components 9 are screws, for example. Components 9 include pieces of component information 13. Pieces of component information 13 are, for example, an image of component 9, the name of component 9 and/or a component number. Pieces of component information 13 are data-technologically provided to control unit 8. Control unit 8 is designed, for example, to display pieces of information to the worker on communication device 7 for carrying out the work step based on the process device capability data and pieces of component information 13. For this purpose, worker 5 is displayed, for example, "install screw X" with the aid of process device 4a.

Control unit 8 is designed as a processing unit. Control unit 8 is designed to carry out and/or execute a process sequence 10 of a process. Communication device 7 is activated, in particular, based on process sequence 10. Process sequence 10 is represented here as a flow chart. In a first step, two components 9 are installed in one work step 14a. For example, two components 9 are connected to one another in work step 14a. An intermediate product 15 is produced with the aid of work step 14a. Intermediate product 15 is further processed in a work step 14b using an additional component 9. For example, a screw is screwed into intermediate product 15 in work step 14b. Workpiece 6 then results from work step 14b. Control unit 8 is designed to display pieces of information to worker 5 for the work steps, in particular, 14a and 14b, for carrying out the work step. For work step 14a, for example, the worker is displayed "connect the two components 9 to one another" with the aid of process device 4a, for work step 14b, the worker being displayed "screw screw 9" into intermediate product 15 with the aid of process device 4a.

FIG. 3 shows by way of example, a sequence for the implementation of a process including three work steps 14a, 14b and 14c. A control unit 8 interprets and checks in a first step 15 work schedule 10. In a step 16a and 16b, communication device 7 is activated to display to worker 5 that a bit is to be mounted at process device 4a. The implementation of further process sequence 10 is then paused until it is confirmed by worker 5 in a step 17 that work step 14a, the changing of the bit, is completed. In a step 18a and 18b, it is reported back to control unit 8 that work step 14a is completed. Process sequence 10 is then further carried out.

Work step 14a is followed by a work step 14b. Work step 14b provides for the screwing with the aid of process device 4a. In step 19, process device 4a is activated by control unit 8 to release the actuator button. In a step 20, process device 4a releases the actuator button. The release of actuator button 19 is followed by step 21, in which communication device 7 is activated to display pieces of information to worker 5, for example, an image, how he/she must screw. This is displayed until step 22 is carried out and drilled by the worker. In the process, the actuation of process device 4a is sensorially determined by worker 5. The actuation in step 22 is data-technologically transmitted in step 23 to control unit 8. Step 23 is followed by work step 14c. For this purpose, process device 4b is activated in a step 24 to carry out a work step. Process device 4b is an automatic process device and requires no actuation by worker 5. In step 25, the work step is thus automatically carried out by process device 4b. In step 26, the actuation and/or the completion of step 25 is data-technologically communicated to process device 8.

What is claimed is:

1. A worker guidance system for guiding a worker when carrying out a process using a process system, the process including work steps to be carried out, the process system including process devices having process device capabilities, the worker guidance system comprising:
   a control unit and a communication device, the control unit being configured to activate the communication device based on process data to communicate to the worker the work steps to be carried out by the worker using the process devices, wherein the control unit is provided with the process device capabilities as process device capability data, the process data including the process device capability data;
   wherein the control unit, using the communication device and based on the process data, is configured to communicate to the worker steps for dismantling a process device of the process devices, and subsequent the dismantling, to communicate to the worker steps to assemble another process device of the process devices.

2. The worker guidance system as recited in claim 1, wherein the process data include a process sequence.

3. The worker guidance system as recited in claim 1, wherein the process device capability data include pieces of information relating to the work step to be communicated.

4. The worker guidance system as recited in claim 1, wherein the control unit is configured to select a process device suitable for the work step and/or the process, based on the process, and/or on the work step, and/or on the process sequence and/or on the process data.

5. The worker guidance system as recited in claim 1, wherein the control unit is configured to start the process devices to carry out the work steps and/or to activate the process devices to carry out the work steps.

6. The worker guidance system as recited in claim 1, wherein the process includes an installation of a component and/or a use of a component, and wherein the process data includes pieces of component information.

7. The worker guidance system as recited in claim 1, further comprising:
   a sensor unit configured to monitor the work steps and to provide sensor data, the process data including the sensor data.

8. The worker guidance system as recited in claim 1, wherein the process includes at least two work steps, the control unit being designed to activate the communication device based on the process data to communicate to the worker the two work steps of the process for carrying out the process.

9. The worker guidance system as recited in claim 8, wherein the two work steps are represented as a sequence and/or are configured as a sequence and/or a linked structure of process device capabilities.

10. The worker guidance system as recited in claim 9, wherein the control unit is configured to extract and to display, using the communication device, pieces of information to be communicated based on the process, and/or on the work step, and/or on the process device capabilities, and/or on the process data.

11. The worker guidance system as recited in claim 1, further comprising:
a feedback device configured to provide an actuation by the worker as worker data, the process data including the worker data.

12. A process system, comprising:
process devices having process device capabilities; and
a worker guidance system configured to guide a worker when carrying out a process using the process system, the process including work steps to be carried out, the worker guidance system including:
a control unit and a communication device, the control unit being configured to activate the communication device based on process data to communicate to the worker the work steps to be carried out by the worker using the process devices, wherein the control unit is provided with the process device capabilities as process device capability data, the process data including the process device capability data;
wherein the control unit, using the communication device and based on the process data, is configured to communicate to the worker steps for dismantling a process device of the process devices, and subsequent the dismantling, to communicate to the worker steps to assemble another process device of the process devices.

13. A method for guiding a worker when carrying out a work step, the method comprising the following:
communicating to the worker a work step to be carried out by the worker using process devices, the communication of the work step to be carried out taking place based on process data, the process data including process device capability data, the process devices having process device capabilities and the process device capability data including the process device capabilities;
communicating to the worker, based on the process data, steps for dismantling a process device of the process devices, and subsequent the dismantling, communicating to the worker, based on the process data, steps to assemble another process device of the process devices.

14. A non-transitory machine-readable memory medium on which is stored a computer program for guiding a worker when carrying out a work step, the computer program, when executed by a computer, causing the computer to perform:
communicating to the worker a work step to be carried out by the worker using process devices, the communication of the work step to be carried out taking place based on process data, the process data including process device capability data, the process devices having process device capabilities and the process device capability data including the process device capabilities;
communicating to the worker, based on the process data, steps for dismantling a process device of the process devices, and subsequent the dismantling, communicating to the worker, based on the process data, steps to assemble another process device of the process devices.

* * * * *